United States Patent
Hofmann et al.

[11] Patent Number: 5,960,921
[45] Date of Patent: Oct. 5, 1999

[54] FRICTION CLUTCH WITH SPACER SLEEVES

[75] Inventors: Klaus Hofmann, Leutershausen; Claus Orth, Mönchstockheim; Thomas Göppner, Salz; Klaus Betten, Rütschenhausen, all of Germany

[73] Assignee: Mannesmann Sachs AG, Schweinfurt, Germany

[21] Appl. No.: 08/974,030

[22] Filed: Nov. 19, 1997

[30] Foreign Application Priority Data

Dec. 5, 1996 [DE] Germany .................. 196 50 462

[51] Int. Cl.⁶ ..................... F16D 13/50; F16D 13/44
[52] U.S. Cl. ....................... 192/70.27; 192/89.23
[58] Field of Search ................. 192/70.27, 70.28, 192/89.23, 70.2, 89.22, 91–103

[56] References Cited

U.S. PATENT DOCUMENTS

| | | | |
|---|---|---|---|
| 3,385,409 | 5/1968 | Smirl | 192/70.27 X |
| 3,389,768 | 6/1968 | Cook | 192/70.27 X |
| 5,004,087 | 4/1991 | Huber | 192/70.27 X |
| 5,638,932 | 6/1997 | Mizukami | 192/70.27 X |

FOREIGN PATENT DOCUMENTS

| | | | |
|---|---|---|---|
| 1 255 911 | 12/1971 | United Kingdom . | |
| 1 506 738 | 4/1978 | United Kingdom . | |
| 2 165 321 | 4/1986 | United Kingdom . | |
| 2251899 | 7/1992 | United Kingdom | 192/70.27 |

*Primary Examiner*—Rodney H. Bonck
*Assistant Examiner*—Roger Pang
*Attorney, Agent, or Firm*—Cohen, Pontani, Lieberman & Pavane

[57] ABSTRACT

A friction clutch with a diaphragm spring which is fixed by a plurality of screws or rivets introduced at the housing. Each of these screws or rivets is surrounded by a spacer sleeve which is clamped between the housing and a circumferentially extending ring. Centering shoulders are provided in the ring for fixing the spacer sleeves, especially during operation.

7 Claims, 4 Drawing Sheets

FRICTION CLUTCH WITH SPACER SLEEVES

BACKGROUND OF THE INVENTION

1. Field of the Invention

The invention relates to a friction clutch for motor vehicles. The invention further relates to a friction clutch which includes a flywheel having a friction surface, a clutch housing fastened to the flywheel, a hub arranged in the clutch housing, at least one clutch disk connected with the hub so as to be fixed with respect to rotation relative thereto, a contact pressure plate connected with the clutch housing and with the flywheel so as to be fixed with respect to rotation relative thereto but so as to be axially displaceable, and a diaphragm spring arranged between the clutch housing and the contact pressure plate for loading the contact pressure plate in the direction of the flywheel for clamping the clutch disk between the friction surfaces of the contact pressure plate and the flywheel.

2. Description of the Prior Art

A friction clutch of this constructional type is known, for example, from the English patent 1 506 738. In this known construction, the diaphragm spring for generating the contact pressure force for the clutch disks is supported, on the one hand, at the inner wall of the clutch housing and, on the other hand, at a concentrically arranged ring which is fastened to the clutch housing by screws with, in each instance, the intermediary of a spacer sleeve. The end faces of the spacer sleeves contact a corresponding countersurface of the ring.

Due to the greater degree of loading of all of the structural component parts of the clutch, especially owing to torsional vibrations in modem motor vehicles, the connection between the spacer sleeves and the ring in accordance with the prior art is no longer a match for all loads.

SUMMARY OF THE INVENTION

Accordingly, it is an object of the present invention to provide a support at this location which, above all, is equal to the torsional vibrations in modern engines, also for sporting uses.

Pursuant to this object, and others which will become apparent hereafter, one aspect of the present invention resides in a friction clutch having a circumferentially extending ring with a contact bead arranged to support a side of the diaphragm spring located opposite the clutch housing. A plurality of spacer sleeves are arranged concentrically to the axis of rotation of the flywheel and circumferentially on the clutch housing so as to support the circumferentially extending ring. The spacer sleeves penetrating corresponding openings in the diaphragm spring. Every spacer sleeve is fixed, at least in the circumferential direction, in the region where it contacts the ring by its outer diameter at centering shoulders of the ring. This is particularly advantageous with respect to favorable support, principally against the torsional vibrations acting especially in the circumferential direction. In addition, the assembly of the individual structural component parts is substantially facilitated by the guiding provided by the centering shoulders.

In another embodiment of the invention, the centering shoulders extend substantially radially and parallel to one another in pairs. Such a construction can easily be manufactured with high accuracy.

However, it is also possible to construct the centering shoulders with a circular shape so that the spacer sleeves are guided in all radial directions.

In a particularly practical embodiment the centering shoulders are formed of a half-circle and of straight partial pieces adjoining the half-circle which extend radially and parallel to one another. The straight partial pieces can be produced by means of a simple cutting process and, when the straight partial pieces extend radially inward into open space, form a support for the spacer sleeves in the circumferential direction as well as in the radial outward direction.

For this purpose, each spacer sleeve is preferably penetrated by a fastening screw. Fastening screws are advantageous when, according to assembly, exactly predetermined tensile stresses must be observed. Naturally, with less strict requirements, it is also possible to use rivets.

The fastening screws can be supported by their head at the clutch housing, wherein the thread engages in a corresponding thread in the ring. However, under confirmed conditions, it is also possible to introduce the screws from the side of the ring and to screw them into a thread in the housing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
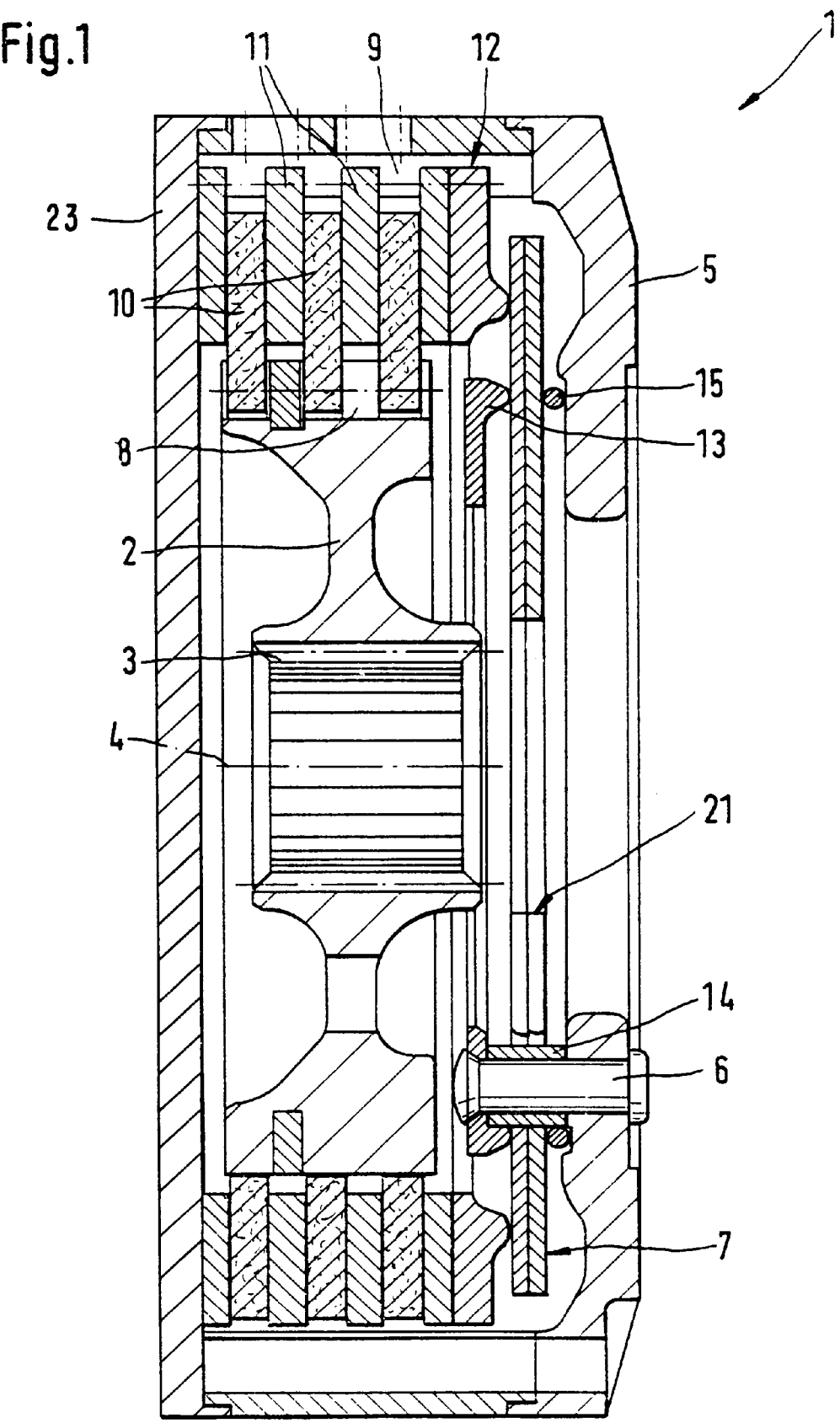
FIG. 1 is a longitudinal section through a complete friction clutch pursuant to the present invention.

FIG. 1 shows a friction clutch 1 which is constructed, for example as a multiple-disk clutch. The friction clutch 1 is enclosed by a clutch housing 5 which is fastened in a manner not shown more fully, for example, to the flywheel 23 of an internal combustion engine. A plurality of inner disks 10 and a plurality of outer disks 11 are arranged one behind the other axially between the flywheel, not shown, and the clutch housing 5. The inner disks engage in a toothing 8 of a hub 2 and the outer disks 11 engage in a toothing 9 of the clutch housing 5. The disks 10, 11 are arranged in these toothings 8, 9 so as to be fixed with respect to rotation relative thereto, but so as to be displaceable axially. The hub 2 has an inner toothing 3 by which it is arranged on a gear shaft, not shown, so as to be fixed with respect to rotation relative to it, but displaceable axially. This gear shaft defines a rotational axis 4.

A contact pressure plate 12 is arranged between the outer disk 11, which is at the greatest axial distance from the flywheel, and a diaphragm spring 7 which generates a contact pressing force. This contact pressure plate 12 is likewise connected with the housing 5 so as to be fixed with respect to rotation relative to it. The diaphragm spring 7 is formed, in the illustrated embodiment, from two individual springs placed one on top of the other and is supported on a medium or mid-diameter at the clutch housing 5 and on a greater diameter at the contact pressure plate 12. To represent its tip circle, a plurality of rivets 6 are distributed about the circumference of the spring 7. These rivets 6 are anchored in the clutch housing 5, penetrate the diaphragm spring 7 in corresponding openings 22, and fix a ring 13 on the side of the diaphragm spring 7 located opposite from the clutch housing 5. The diaphragm spring 7 is supported at this ring 13 on the one side and on the other side is supported either directly at the housing 5 or at a ring 15 arranged between the housing 5 and the diaphragm spring 7. The ring 15 is fixed in the radial direction by the plurality of rivets 6. The rivets 6 also fasten each of the spacer sleeves 14 which are clamped axially between the clutch housing 5 and the ring 13 and which exactly determine the freedom of movement of the diaphragm spring 7 between the ring 13 and the ring 15.

The friction clutch 1 functions in principle as described in the following. In the engaged state corresponding to FIG. 1, the inner disks 10 and the outer disks 11 are pressed in the direction of the flywheel by the pretensioning force of the diaphragm spring 7 and, as a result of the friction force which is accordingly built up between the individual disks, a torque can be transmitted from the housing 5, via the disks 10, 11, to the hub 2 and thus to the gear shaft. For the purpose of disengagement, the spring tongues of the diaphragm spring 7 are swiveled in the direction of the flywheel by a disengaging system, not shown, so that the radial outer region of the diaphragm spring 7 can no longer exert its force on the contact pressure plate 12, so that the individual disks 10, 11 become free from one another and the transmission of torque is interrupted.

Figure 2:
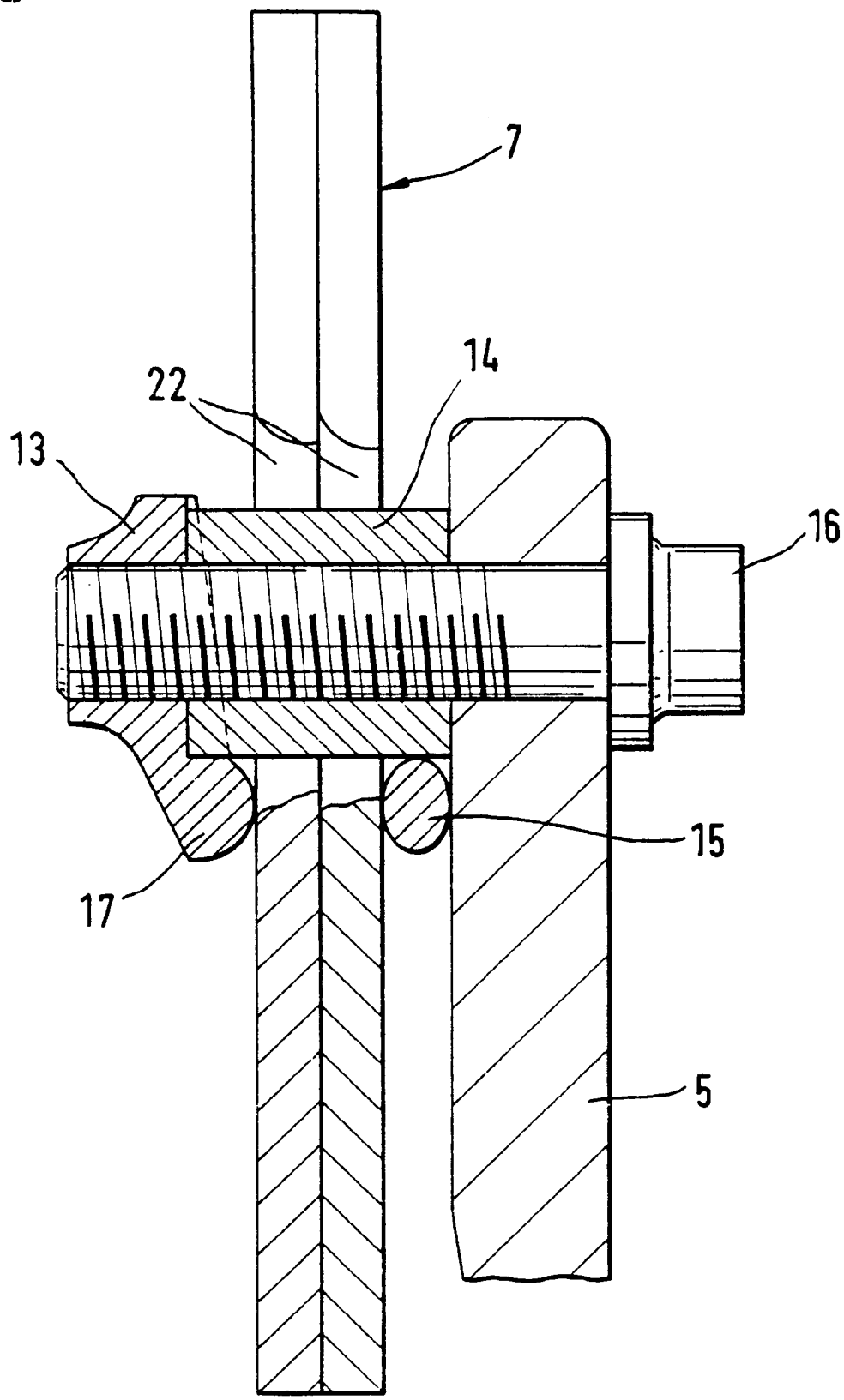
FIG. 2 is an enlarged view of a section of the fastening area.

FIG. 2 shows a section of FIG. 1 in an enlarged view. This view shows a slightly different embodiment than FIG. 1. The diaphragm spring 7 is clamped between the housing 5 and the ring 13 in that the ring 13 has a bead 17 which is arranged exactly across from the ring 15 axially. The axial distance between the bead 17 and the ring 15 is fixed by the spacer sleeve 14 which is clamped between the housing 5 and the ring 13 by screws 16'. In the present case, the screws 16 used here are arranged so that their head contacts the outer wall of the housing 5 and are screwed by their thread into a corresponding thread of the ring 13. Naturally, it is also possible to install the screws 16 differently according to space requirements. The screws 16 and the spacer sleeves 14 penetrate the corresponding opening 22 in the diaphragm spring 7.

Figure 3:
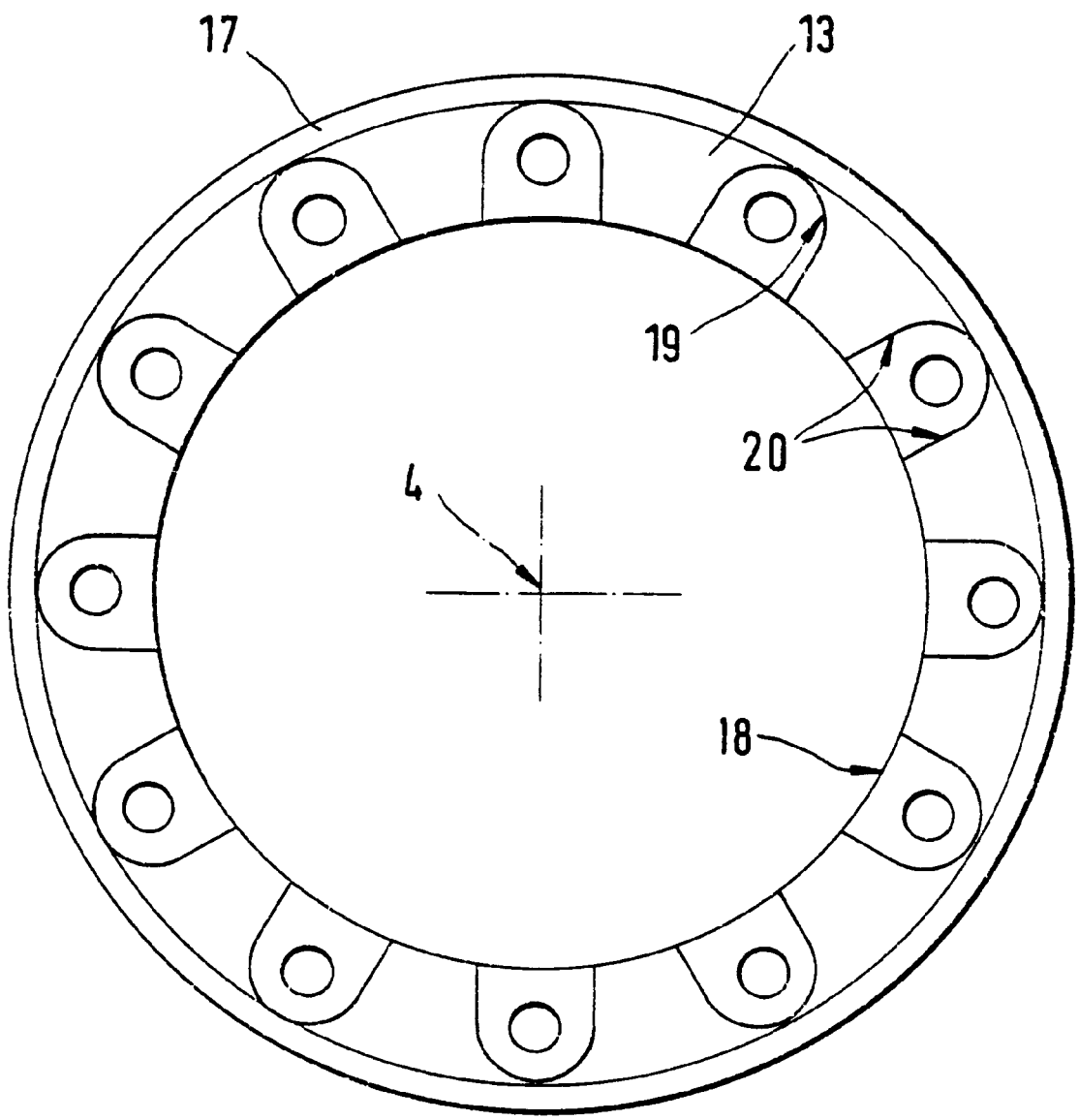
FIG. 3 is a front view of the ring.
Figure 4:
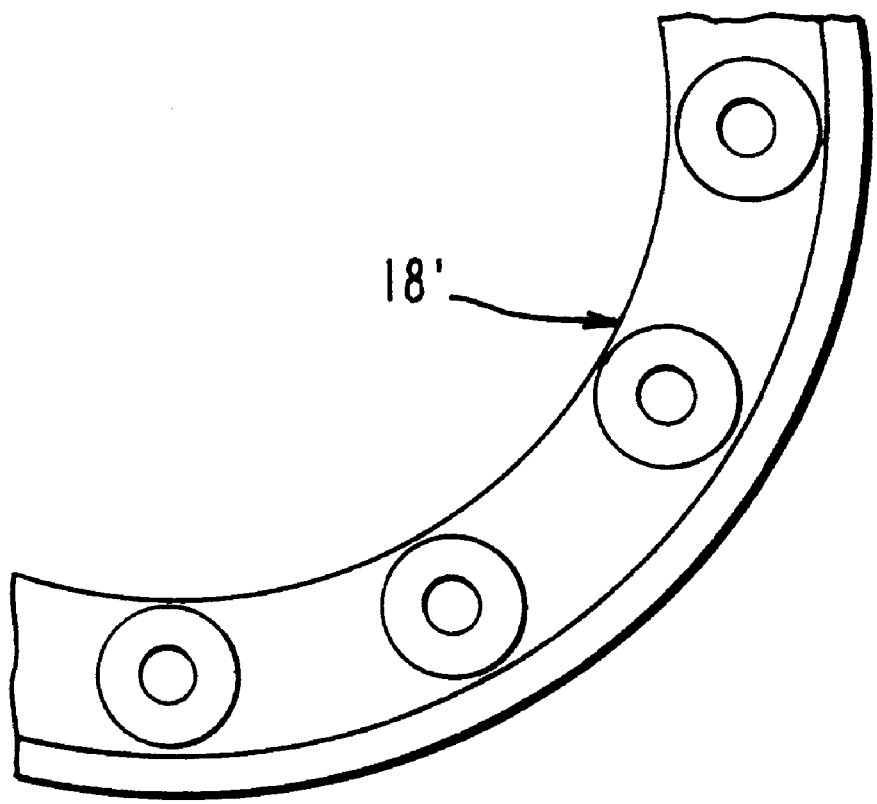
FIG. 4 is a partial view of the circumferentially extending ring showing a circular centering shoulders.

As is indicated in FIG. 2 by a dashed line, a centering shoulder 18 is provided—according to FIG. 3—in the ring 13 at each point of support for a spacer sleeve 14. Each centering shoulder 18 is formed by a half-circle 19 concentric to the axis of the screws 16 and by two straight partial pieces 20 which adjoin the half-circle 19 and extend radially inward. These centering shoulders 18 fix the spacer sleeves 14 at the ring 13 during the assembly process and during operation, namely, in the present case, in the circumferential direction and radially outward. These two centering directions are particularly important, since the two straight partial pieces 20 provide support in the circumferential direction due to the torsional vibrations of the internal combustion engine and the respective half-circle 19 provides a support against centrifugal force. FIG. 4 shows another embodiment in which the centering shoulders 18' are circular in shape.

The type of fastening of the ring 13 via the spacer sleeves 14 is not limited to a disk clutch corresponding to FIG. 1, but rather can be used in principle in any friction clutch which is outfitted with a diaphragm spring or a diaphragm spring set.

The invention is not limited by the embodiments described above which are presented as examples only but can be modified in various ways within the scope of protection defined by the appended patent claims.

We claim:

1. A friction clutch for a motor vehicle, comprising:
   a flywheel which defines an axis of rotation and has a friction surface;
   a clutch housing fastened to the flywheel;
   a hub arranged in the clutch housing, the hub having an inner toothing that is placeable on a gear shaft concentric to the axis of rotation so as to be fixed with respect to rotation relative to the gear shaft;
   at least one clutch disk connected with the hub so as to be fixed with respect to rotation relative thereto;
   a contact pressure plate connected with the clutch housing and with the flywheel so as to be fixed with respect to rotation relative thereto, but so as to be axially displaceable, the contact pressure plate having a friction surface;
   a diaphragm spring arranged between the clutch housing and the contact pressure plate for loading the contact pressure plate in a direction of the flywheel for clamping the clutch disk between the friction surfaces of the contact pressure plate and the flywheel;
   one of a contact bead and a wire ring arranged so as to support the diaphragm spring at the clutch housing on a medium diameter;
   a circumferentially extending ring with a contact bead arranged to support a side of the diaphragm spring located opposite the clutch housing;
   a plurality of spacer sleeves arranged concentrically to the axis of rotation and circumferentially on the clutch housing so as to support the circumferentially extending ring, the spacer sleeves penetrating corresponding openings in the diaphragm spring; and
   means for fixing the spacer sleeves at the clutch housing, the circumferentially extending ring having centering shoulders configured to contact each spacer sleeve so as to fix the spacer sleeve in a form-locking manner with the circumferentially extending ring at least in the circumferential direction.

2. A friction clutch according to claim 1, wherein the centering shoulders are configured to extend substantially radially.

3. A friction clutch according to claim 1, wherein the centering shoulders are configured to have a circular shape.

4. A friction clutch according to claim 1, wherein the centering shoulders are formed of a half-circle and straight partial pieces that adjoin the half-circle and extend radially and parallel to one another.

5. A friction clutch according to claim 1, wherein the fixing means includes a plurality of fastening screws, each of the spacer sleeves being penetrated by one of the fastening screws.

6. A friction clutch according to claim 5, wherein each of the fastening screws has a head supported at the clutch housing, and a thread that engages in a corresponding thread in the circumferentially extending ring.

7. A friction clutch according to claim 1, wherein the fixing means includes a plurality of rivets, each of the spacer sleeves being penetrated by one of the rivets.

\* \* \* \* \*